United States Patent [19]

Sekine

[11] Patent Number: 4,810,860
[45] Date of Patent: Mar. 7, 1989

[54] ELECTRONIC INSTRUMENT

[75] Inventor: Kazumi Sekine, Kawasaki, Japan

[73] Assignee: Canon Kabushiki Kaisha, Tokyo, Japan

[21] Appl. No.: 108,221

[22] Filed: Oct. 14, 1987

Related U.S. Application Data

[63] Continuation of Ser. No. 784,175, Oct. 4, 1985, Pat. No. 4,711,992, which is a continuation of Ser. No. 728,161, Apr. 30, 1985, Pat. No. 4,567,354, which is a continuation of Ser. No. 525,211, Aug. 22, 1983, abandoned.

[30] Foreign Application Priority Data

Aug. 30, 1982 [JP] Japan ................................. 57-149170

[51] Int. Cl.[4] .......................... G06C 7/02; H01H 9/26
[52] U.S. Cl. .............................. 235/145 R; 235/1 D; 200/5 A; 200/512; 361/399
[58] Field of Search ...................... 235/145 R, 1 D; 200/5 A, 159 B; 361/399

[56] References Cited

U.S. PATENT DOCUMENTS

| | | | |
|---|---|---|---|
| 3,777,222 | 12/1973 | Harris | 235/145 R X |
| 4,158,115 | 6/1979 | Parkinson et al. | 200/5 A |
| 4,317,011 | 2/1982 | Mazurk | 200/5 A |
| 4,567,354 | 1/1986 | Sekine | 200/5 A X |
| 4,711,992 | 12/1987 | Sekine | 235/145 R |

Primary Examiner—B. R. Fuller
Attorney, Agent, or Firm—Fitzpatrick, Cella, Harper & Scinto

[57] ABSTRACT

An electronic instrument comprises a printed circuit substrate on which electrical parts are actually mounted, a frame placed on the front side of the printed circuit substrate and having openings at least at positions corresponding to the electrical parts, a front sheet disposed at a position opposed to the printed circuit substrate with the frame interposed therebetween and provided with an adhesion margin on the peripheral portion thereof, a back sheet disposed on the back side of the printed circuit substrate and provided with an adhesion margin on the peripheral portion thereof, and an adhesive agent applied to the adhesion margins of the front sheet and the back sheet to cause the printed circuit substrate and the frame to be sandwiched between the front sheet and the back sheet.

7 Claims, 2 Drawing Sheets

FIG. I

ELECTRONIC INSTRUMENT

This is a continuation of application Ser. No. 784,175 filed Oct. 4, 1985, now U.S. Pat. No. 4,711,992, which was a continuation of Ser. No. 728,161 filed Apr. 30, 1985, now U.S. Pat. No. 4,567,354, which was a continuation of Ser. No. 525,211 filed Aug. 22, 1983, now abandoned.

BACKGROUND OF THE INVENTION

1. Field of the Invention

This invention relates to an electronic instrument, and more particularly to an electronic instrument such as an electronic desk top calculator comprising various parts mounted between an upper case and a lower case.

2. Description of the Prior Art

Heretofore, such an electronic instrument, particularly an electronic desk top calculator (hereinafter referred to as the electronic calculator) has comprised parts such as an upper case, a lower case, an ornamental plate, a liquid crystal display device, an LSI circuit, a battery cell, a printed circuit substrate, etc., and has been assembled as by securing the ornamental plate to the upper case with adhesive, securing the printed circuit substrate having electrical parts such as the LSI circuit mounted thereon to the upper case from the inner side thereof by means of screws, and securing the lower case to the upper case by means of screws.

Thus, in conventional electronic instruments, the parts thereof have often been secured to one another by a plurality of methods such as securing with adhesives and fasteners, such as screws. These methods have lead to complicated assembly and also have detracted from the beauty of the instrument because the heads of screws used to secure the lower case to the upper case appear outside the instrument.

SUMMARY OF THE INVENTION

It is therefore an object of the present invention to eliminate the above-noted disadvantages peculiar to the prior art and to provide an electronic instrument which is simple and inexpensive to manufacture and which has a fine appearance and a good performance.

It is another object of the present invention to provide an electronic instrument which is simplified in structure.

It is still another object of the present invention to provide an electronic instrument which is easy and inexpensive to assemble and which has a key input function.

Other objects of the present invention will become apparent from the following detailed description taken in conjunction with the accompanying drawings.

DESCRIPTION OF THE PREFERRED EMBODIMENTS

Figure 1:
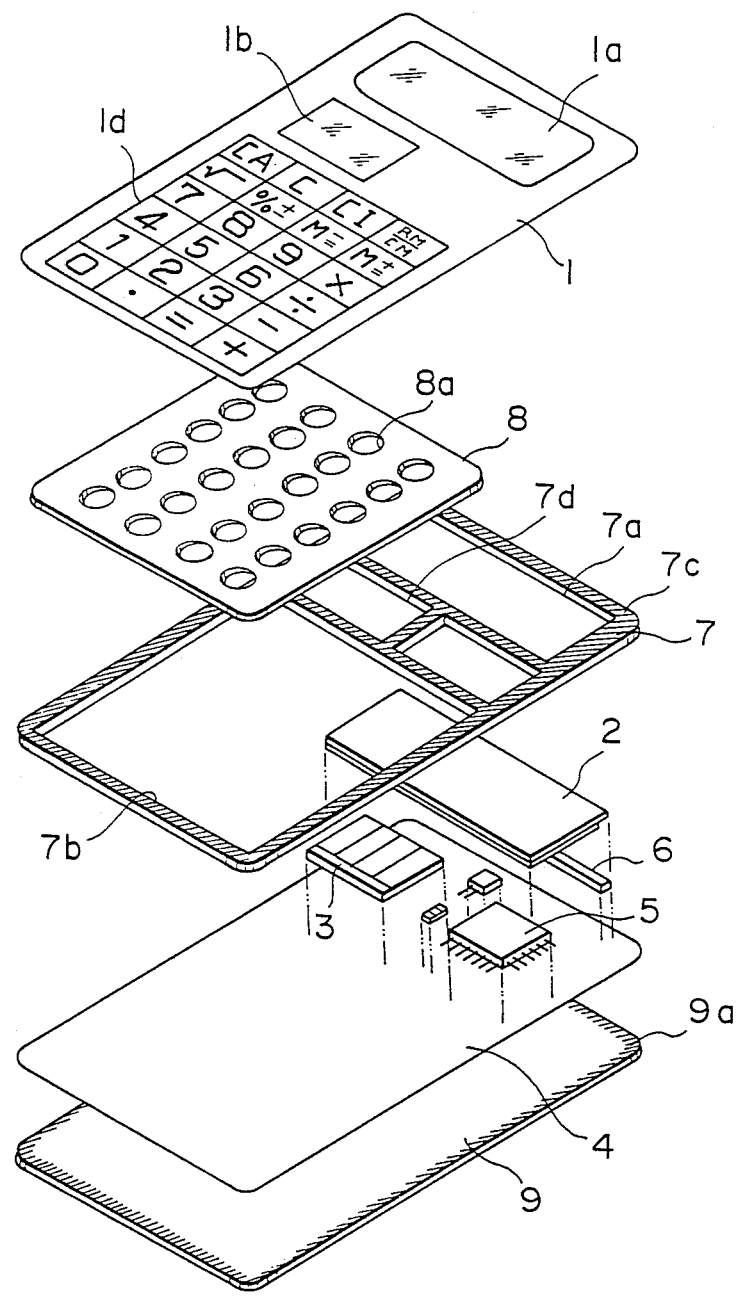
FIG. 1 is an exploded perspective view showing the structure of an electronic instrument in accordance with the present invention.

The invention will hereinafter be described in detail with respect to an embodiment thereof shown in the drawings. In the following embodiment, description will be made with a small electronic calculator taken as an example of the electronic instrument.

Designated by reference numeral 1 in FIG. 1 is a transparent film sheet having flexibility. Various characters and symbols are printed on the sheet 1 correspondingly to input keys 1d necessary for digit entry and operation. The upper portion of the sheet 1 provides a transparent portion 1a through which the display portion of a display device 2 may look out, and the lower portion thereof is provided with a transparent portion 1b which provides a light-receiving opening for a solar cell 3. A pattern such as key electrodes 1c is formed on the back of the sheet 1 by a method such as carbon printing.

Figure 2:
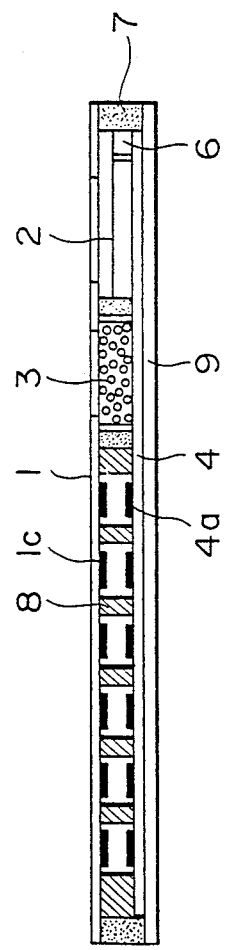
FIG. 2 is a cross-sectional view of the electronic instrument shown in FIG. 1.

In addition to the above-mentioned solar cell 3, an electrical part such as an LSI circuit 5 is electrically connected to a printed circuit substrate 4 as by soldering. The display device 2 is electrically connected to the printed circuit substrate 4 through an electrically conductive connector 6. Key electrodes 4a are formed on the printed circuit substrate 4 at positions opposed to the key electrodes 1c formed on the back of the sheet 1 (see FIG. 2).

Designated by 7 is a frame directed to the positioning of the display device 2, etc. and constituting the framework of the small electronic calculator of the present embodiment. This frame 7 is formed with cut-out portions 7a, 7d and 7b corresponding to the display device, the solar cell portion and the key electrode portion, respectively. A spacer 8 formed of an insulating material is disposed between the sheet 1 and the printed circuit substrate 4. The spacer 8 is for spacing the key electrodes 1c formed on the back of the sheet 1 apart from the key electrodes 4a formed on the printed circuit substrate 4, and through-holes 8a are formed in the spacer 8 at positions corresponding to the key electrodes. When any numeral or symbol on the sheet 1 is manually depressed, the electrodes 1c and 4a corresponding thereto come into contact with each other, whereby a key input is obtained. Designated by 9 is a reinforcing plate which is a second sheet corresponding to the conventional lower case.

The procedure for assembling the electronic calculator having the above-described construction will now be described. An adhesive agent is applied to the peripheral portion 9a of the reinforcing plate 9 indicated by hatching in FIG. 1, and the printed circuit substrate 4, on which the necessary electronic parts such as the LSI circuit 5 and solar cell 3 have already been mounted and wiring has been finished, is placed on the reinforcing plate 9. In this case, the printed circuit substrate 4 is made somewhat smaller than the reinforcing plate 9 so that when placed thereon, at least the peripheral portion 9a to which the adhesive agent is applied is exposed. When the frame 7 is then superposed on the reinforcing plate 9, the underside of the frame 7 is adhered to the peripheral portion 9a to which the adhesive agent is applied. Subsequently, the connector 6 and display device 2 are dropped into the cut-out portion 7a of the frame 7, and then the spacer 8 is dropped into the cut-out portion 7b. Thereafter, an adhesive agent is applied to the upper surface 7c of the frame 7 indicated by hatching and the sheet 1 is adhered thereto, whereby the small electronic calculator is completed.

As described above, the electronic calculator according to the present invention employs only an adhesive agent as the means for securing parts together and thus, the process of assembly is simple, the electronic calculator presents a fine appearance because there is no screws or the like seen on its exterior. Further, as is apparent from FIG. 2, the sheet 1 and the reinforcing plate 9 are secured with adhesive to the frame 7 and therefore, the parts such as display device 2 and solar cell 3 can be hermetically sealed and, therefore, can be made water-tight.

While the present invention has been described with respect to an electronic calculator, this is not restrictive and the present invention is of course applicable also to compact electronic instruments such as electronic calculators or game apparatuses provided with a compound function. As regards the type of adhesive agent and the method of applying the adhesive agent, any type of adhesive agent may be employed which can provide the above-described effect and the method of applying the adhesive agent is restricted in no way.

What I claim is:

1. An electronic instrument, comprising:
   battery means for supplying electric energy to said instrument;
   display means for displaying information;
   an upper member having front and back sides, said upper member comprising a flexible sheet, said battery means and said display means being mounted in the region of said back side, said upper member further having a portion permitting information displayed on said display means to be perceived from the exterior of said instrument, said upper member further comprising at least one key symbol;
   a circuit substrate having an area smaller than that of said upper member and comprising a circuit pattern including at least one fixed contact, corresponding to said at least one key symbol, used for key input;
   connector means for connecting said display means to said circuit substrate;
   movable contact means positioned between said upper member and said circuit substrate, a key input being obtained by contact of said movable contact means with said at least one fixed contact;
   spacing means normally for maintaining said movable contact means spaced from said at least one fixed contact of said circuit substrate when said at least one key symbol of said upper member is not depressed and for permitting said movable contact means to contact said at least one fixed contact of said circuit substrate to produce a key input when said at least one key symbol is depressed;
   a lower member provided at a position to sandwich said circuit substrate between at least a portion of said lower member and at least a portion of said upper member, said lower member having a recessed area formed within the periphery thereof, said recessed area receiving said circuit substrate, said battery means, said display means and said spacing means within the height of said lower means; and
   means for adhesively securing said upper member to the periphery of said lower member,
   wherein a thickness of said spacing means is so determined that said upper member may be in contact with said spacing means in a substantially flat state.

2. An electronic instrument according to claim 1, wherein said movable contact means are mounted with said back side of said flexible sheet.

3. An electronic instrument according to claim 1, wherein said circuit substrate has contacts for establishing electrical connection to said battery means and said connector.

4. An electronic instrument according to claim 1, wherein said lower member comprises frame means having a recessed area for positioning said battery means and said display means, and reinforcing plate means fixed on one side of said frame means by the adhesion.

5. An electronic instrument comprising:
   battery means for supplying electric energy to said instrument;
   display means for displaying information;
   a first member having a front side and a back side, said first member comprising a flexible sheet, said battery means and said display means being mounted in the region of said back side, said first member further having a portion permitting information displayed on said display means to be perceived from the exterior of said instrument, said first member further comprising at least one key symbol;
   a circuit substrate having an area smaller than that of said first member and comprising a circuit pattern including at least one fixed contact, corresponding to said at least one key symbol, used for key input;
   connector means for connecting said display means to said circuit substrate;
   movable contact means positioned between said first member and said circuit substrate, a key input being obtained by contact of said movable contact means with said at least one fixed contact;
   spacing means normally for maintaining said movable contact means spaced from at least one said fixed contact of said circuit substrate when said at least one key symbol of said upper member is not depressed and permitting said movable contact means to contact said at least one fixed contact of said circuit substrate to produce a key input when said at least one key symbol is depressed;
   frame means formed so as to accommodate said battery means, said display means, said circuit substrate, and said spacing means within the height of said frame means, said battery means and said display means being located within an area surrounded by said frame means;
   a second member provided at a position to sandwich said circuit substrate and said frame means between at least a portion of said second member and at least a portion of said first member;
   means for securing said first member to the periphery of said frame means; and
   means for securing said second member to the periphery of said frame means,
   wherein a thickness of said spacing means is so determined that said first member may be in contact with said second member and said spacing means in a substantially flat state.

6. An electronic instrument according to claim 5, wherein said movable contact means are mounted with said back side of said first member.

7. An electronic instrument according to claim 5, wherein said circuit substrate has contacts for establishing electrical connection to said battery means and said connector means.

* * * * *

UNITED STATES PATENT AND TRADEMARK OFFICE
CERTIFICATE OF CORRECTION

PATENT NO.  : 4,810,860
DATED       : March 7, 1989
INVENTOR(S) : KAZUMI SEKINE

It is certified that error appears in the above-identified patent and that said Letters Patent is hereby corrected as shown below:

COLUMN 1
    Line 15, change "desk top" to --desktop--.
    Line 19, change "desk top" to --desktop--.
    Line 33, change "lead" to --led--.

COLUMN 2
    Line 9, change "look out," to --be seen--.
    Line 68, change "simple, the" to --simple. Moreover, the--.

COLUMN 3
    Line 1, change "is" to --are--.

Signed and Sealed this

Fifth Day of January, 1993

*Attest:*

DOUGLAS B. COMER

*Attesting Officer*    *Acting Commissioner of Patents and Trademarks*